Aug. 25, 1959 R. L. ALDER 2,901,685
APPARATUS FOR EARTH BOREHOLE INVESTIGATING AND SIGNALING
Filed Oct. 18, 1954 2 Sheets-Sheet 1

Fig.1.

INVENTOR,
ROBERT LEE ALDER
BY
AGENT

Aug. 25, 1959 R. L. ALDER 2,901,685
APPARATUS FOR EARTH BOREHOLE INVESTIGATING AND SIGNALING
Filed Oct. 18, 1954 2 Sheets-Sheet 2

INVENTOR,
ROBERT LEE ALDER
BY
AGENT

United States Patent Office 2,901,685
Patented Aug. 25, 1959

2,901,685

APPARATUS FOR EARTH BOREHOLE INVESTIGATING AND SIGNALING

Robert Lee Alder, La Canada, Calif., assignor, by mesne assignments, to Dresser Industries, Inc., Dallas, Tex., a corporation of Delaware Application October 18, 1954, Serial No. 462,724

4 Claims. (Cl. 323—74)

This invention relates to earth borehole investigation systems and more particularly to methods and apparatus for measuring an unknown value of a physical quantity at an inaccessible location in such borehole while concurrently encoding a number representing the measured value of the quantity according to a mathematical code. The purpose of encoding the measured value is to increase the efficiency of signaling of the obtained information or measurement to an accessible point outside the borehole where the information is analyzed or recorded for future use.

Information of the type generally obtained in earth borehole investigations is in the form of numerical data resulting from measurements of various types. Previously known systems for transmitting the data from within the borehole to a point outside the borehole have relied upon conductor cables for electrical transmission of electric signals or electric currents representing the quantities to be measured, or upon inefficient signaling means of other types wherein signals represented directly and with a low degree of accuracy the numerical values of the measurements. In the former mode of transmitting the information, serious errors of uncertain magnitude are introduced by such factors as varying resistance of the conductors due to unknown temperature gradients in the borehole, and in the latter type of signaling, a satisfactory degree of accuracy and a sufficiently broad range of information values were impossible of attainment due to the extreme length of signal required to represent any one of the multitude of the possible measurement values.

It accordingly is a principal object of the invention to provide a simple, automatically acting means to measure an unknown value of a physical quantity at an inaccessible location in a borehole, and concurrently with such measurement effect an encoding according to a number-representing code, of a number representing the value of the measured quantity, to permit signaling of the information to an accessible point outside the borehole with any desired degree of accuracy and with great efficiency.

It is another object of the invention to provide a means for measuring the value of a physical quantity and concurrently therewith encoding a number representing the measurement according to a code permitting the representation of any one of a great number of different values by but a relatively few code or signal elements. The number representing the physical quantity value or measurement may be the actual value of the quantity as measured, or the actual value plus or minus a predetermined amount, or otherwise mathematically related to the actual value in a definite and known manner; whereby when the number is encoded and a signal representing the encoded number is formed, transmitted, received and decoded, the measured value may be precisely determined at the receiving point.

It is another object of the invention to provide a simple and efficient borehole investigating device for concurrently measuring an electrical quantity and encoding a number representing the measured value of the quantity.

It is another object of the invention to provide a simple automatically acting borehole investigating means to measure by a comparison method one or more unknown values of one or more physical quantities or variables at an inaccessible location in a borehole, while concurrently with each individual measurement effecting an encoding of a number representing the value of the respective measured quantity according to a mathematical code, to permit efficient signaling of the information to an accessible point outside the borehole, with any desired degree of accuracy.

The aforementioned objects and other objects and advantages of the invention hereinafter made apparent are attained by investigating means including an electrical comparison network in which is connectible the physical or electrical quantity whose unknown value is to be measured and in which network is connected for comparison with the unknown value a variable arrangement of comparison elements each having a known but individual value of the characteristic to be measured, and which arrangement is "compared," between variations thereof, in the network by means which concurrently acts to encode the value as measured. Details of the comparing procedure will hereinafter be fully explained. The electrical comparison network may be, for example, of the nature of a modified Wheatstone bridge network if resistance is the physical quantity under investigation, or a potentiometer network if an electric potential is the physical quantity whose value is to be measured. The comparison elements may be resistors of known value, for example, when resistance is to be measured; or resistors or other potential sources across each of which a known potential is available, if an electric potential is to be measured. The means for effecting comparison of the known and unknown values of the physical quantity may, in the examples cited, be means including an individual electric switch device for and associated with each comparison element and having the switch so arranged that when in a first position (for example, closed position), its associated comparison element is rendered ineffective in the comparison network; and when in a second position (open position, for example), the comparison element is inserted in and thus rendered effective in the network, or otherwise made active in the network. The switches may be so connected that in the first position each short circuits its comparison element and in its second position removes the short circuit; and the switches may be moved, each in turn from the first to second position to try respective elements in the network and thereafter the switch either left in second position if its element is to be retained in the network, or returned to the first position if its element is to be rejected from the network. In the event such switches are thus used each in its turn in progressively comparing successive arrangements of the comparison elements in the network, the final positions and the arrangement of the switches in the series provide an indication of the values of the comparison values rendered effective in the comparison network and so provide a means for encoding a number representing those values. For example, by arranging the switches and associated comparison elements in a series and assigning to each a serial number related to or indicative of the known value of the particular comparison element, a coded representation of the values of the comparison elements effective in the comparison network may be formulated by merely reading out the switch positions in order of the serial numbers, as will hereinafter be made fully apparent. Such a coded representation would be in the form of a series of symbols of two characters, one character of symbol for each of the switch positions, open and closed. That symbol character representing the switch position corresponding to rejection of a comparison element from the network would always represent a weight or value of zero, while a symbol of the other character would represent according to its serial number or respective position in the series of symbols, a value equal to or otherwise definitely related in a mathematical sense to the value of the corresponding position or serial number of the comparison element represented.

In a preferred embodiment of exemplary apparatus according to and illustrating the principles of the invention, the comparison network is in the form of a balanceable electrical network, and the comparison elements are arranged in a series and each is in the form of a resistor designated by or assignable an individual serial number definitely related to the ohmic value of the resistor; and across which resistor an individual comparison potential of known value (likewise definitely related to its serial number), may be produced for comparison purposes. Each comparison element has associated therewith an individual one of an arrangement of two position electrical switch elements of the type hereinabove indicated. Each switch element is so connected that when in its first or closed position it effectively removes its associated comparison element from a balancing or comparison arm of the electrical network, as, for example, by short circuiting the comparison element; and also is so connected that when in its second or open position it inserts its associated comparison element effectively in the balancing arm of the network. Each of the electrical switch elements has associated with it an encoding switch device which is concurrently moved with the short-circuiting switch element from a first position to a second position. The encoding switch devices may thus be utilized in reading out the final switch positions, or, as is hereinafter explained, may be used in formulating encoded signals precisely representing respective numbers accurately representing measured values. The aforementioned exemplary apparatus also includes discriminator and rejector means, preferably of an electrical nature, capable, when a comparison element has been thus effectively inserted in the network arm, of determining whether the network is thereby overbalanced or underbalanced; and further capable of withdrawing or rejecting the comparison element from the network, but only if the element when thus inserted causes overbalancing of the network. The rejection of such an overbalancing comparison element is preferably accomplished by the discriminator and rejector means by return of the associated switch element to its first position, whereby the returned switch element effectively and electrically removes its comparison element from the network by shorting the element. Thus, the discriminator means is such that if an inserted comparison element leaves the network underbalanced or balanced, the associated switch element is left in its second position with the comparison element accepted and retained in the comparison network. However, if the inserted comparison element causes the network to be overbalanced, the discriminator means is such that the switch element is returned to its first position, again short circuiting and thus rejecting the tried comparison element and electrically removing it from the network.

In the mentioned preferred embodiment of exemplary apparatus according to the invention, the comparison elements preferably have individual values graded or selected according to a mathematical law or formula and preferably according to that defining the binary system of number-representation, whereby advantages of great value are secured in signaling the encoded number from an inaccessible location, such as the lower portion of an earth borehole, to an accessible point such as at the top of such borehole. These advantages accrue in part because the binary system of number representation has as a base or radix the number 2, which is the number of different positions assumed by the comparison-element switches, and because only two types or characters of signal elements are available in the most positive and efficient signaling system available for use in the indicated environment. Also, as in certain other usable systems of number representation, any of a relatively large number of different numerical values may accurately be represented by a relatively small number of number-representing symbols or conditions. In the binary system only two types of symbols or conditions are necessary, and in the ternary system, three symbol types or conditions are necessary. The above-mentioned advantages will hereinafter be made more fully apparent. In accord with the hereinabove stated principle and using for example the binary system of number representation, the comparison elements are in this example made or selected of graded values $Va$ such that $Va = C2^n$ wherein $C$ is a constant dependent upon circuit element values and other design factors, and $n$ is a serial number assigned or assignable to the comparison element and is a number included in a series of preferably consecutive integers which may include zero, the number of integers in the series being equal to the number of comparison elements. An illustrative example will be set out for explanatory purposes, in which eight comparison elements in the form of resistors are employed in a series-connection arrangement in a balanceable resistance bridge network, the resistors being assigned consecutive serial numbers commencing with zero. The relative values of the resistors would thus be in accord with the following table:

| Comparison Element Circuit Designation | Comparison Element (Resistor) Serial Number | Relative Value $Va$ (ohms, volts, etc.) | Relative "Weight" |
|---|---|---|---|
| R0 | 0 | $Va = C2^0 =$ C | 1 |
| R1 | 1 | $= C2^1 =$ 2C | 2 |
| R2 | 2 | $= C2^2 =$ 4C | 4 |
| R3 | 3 | $= C2^3 =$ 8C | 8 |
| R4 | 4 | $= C2^4 =$ 16C | 16 |
| R5 | 5 | $= C2^5 =$ 32C | 32 |
| R6 | 6 | $= C2^6 =$ 64C | 64 |
| R7 | 7 | $= C2^7 =$ 128C | 128 |
| etc. | etc. | etc. | etc. |

It will be understood that in the application of the advantages of number representation by the binary system to the disclosed system, it is only essential that the comparison elements be graded so that a first one is of a given value, the second of value twice that of the first, the third of value twice that of the second, and so on, whereby in the direction of increasing value of comparison elements each succeeding element is of value equal to twice that of the preceding element.

Continuing with the explanation of the illustrative example, and assuming that an unknown value of resistance is to be measured, encoding of a number representing the measure of the value is to be effected or performed, and a signal formulated which represents only that encoded number, the following procedure may be followed. The resistors are selected of values in accord with the cited formula and such that the sum of their resistances is somewhat greater than the maximum value necessary for balancing the network in any measurement contemplated, and such that the resistor of lowest value is no greater than twice the amount defining the limiting degree of accuracy desired in the measurement. For example, if an accuracy of plus or minus one ohm were desired, the lowest valued resistor would be of value no greater than 2 ohms. The resistors are assigned serial numbers (which may be only hypothetical and merely assignable and not actually physically applied) in accordance with the previous cited formula and as indicated in the preceding table. The resistors are "tried" or inserted in the comparison network in turn, each by movement of its switch element from first to second position, commencing with the resistor having the largest value (highest serial number) and continuing until that of lowest value (lowest serial number) has been tried. At each trial of a resistor in the network the latter is energized, and a voltage is thereby produced at the output of the network (if the network is not balanced). The polarity of the network output voltage is dependent upon whether the network has been overbalanced, or left in underbalanced condition. An output voltage indicative of overbalancing is utilized by the discriminator-rejector means to return the switch element to its first position, thus "rejecting" or withdrawing the respective resistor from the balancing arm of the network. An output voltage of the other polarity, indicative of underbalancing, is, however, ineffective to actuate the discriminator-rejector means, the discriminator device being so devised as not to respond to voltage of that polarity. Similarly, absence of any output voltage from the network at the time of trial of a resistor, and indicative of a balanced condition of the network, leaves the discriminator device unresponsive, and the rejector does not operate. Thus a "tried" resistor is withdrawn or rejected from the bridge or comparison network only if its insertion causes overbalancing of the network; otherwise it is retained with its associated switch element remaining in the second position and the associated encoding device likewise in its second position. Using, for example, resistors of values as indicated in the preceding table, and asusming an "unknown" value of resistance to be measured of, for example, 119C ohms, comparison resistor serial No. 7 would be tried and rejected, being of 128C ohms value and such as to cause by its insertion an overbalancing of the network. Comparison resistor serial No. 6 would then be tried, and "accepted" or retained, being of 64C ohms value and insufficient to cause network overbalancing. No. 5 resistor would then be tried and accepted, since together with No. 6 in series, the comparison resistance of $64C+32C=96C$ ohms would be insufficient to cause overbalancing. Resistors Nos. 4, 3, 2, 1 and 0 would thereafter be tried in turn, with Nos. 4, 2, 1 and 0 being accepted or retained and No. 3 rejected. The values of the retained resistors, whose switch elements are left in their second positions, are: 64C, 32C, 16C, 4C, 2C and 1C. Adding these, the sum is 119C, the "unknown" value of resistance. It will be noted that the unknown value was measured to an accuracy of $\pm\frac{1}{2}C$. Thus it is evident that any desired degree of accuracy of measurement may be attained by the method, and any desired range of measurement values covered, by selecting the value of the lowest-valued resistor sufficiently small and by using enough comparison elements or resistors to cover the desired range, the individual comparison element values conforming, of course, to the previously prescribed formula.

From the general description of the operation of an example of a preferred embodiment of the apparatus thus far set out, it may be seen that concurrently with the measuring of the unknown value of the physical quantity, such as resistance, each of the several switch elements has been left either in its first position or in its second position. Hence, if the switch elements or their encoding devices are read out, that is, for example, if a list or other indication of the switch elements or encoding devices is made, in the order in which they were used in the comparison trials in the bridge arm, and the switch element or encoding device position is in each instance indicated, the read-out or listing constitutes an encodement and is a coded representation of a number precisely representing the value of the unknown value as measured. Further, since in the specific example set out the resistors were so arranged and of values such as to be according to a formula representing the binary system of number representation, all that is necessary to convert the list or read-out to a binary encodement of the number representing the measured value of the unknown resistance, is to give the respective units of the list or read-out of the respective switch elements or encoding devices a weight or value equal to zero if the element or device was returned to its first position and its resistor rejected or equal to the tabulated value of the associated resistor if the element or device was left in its second position and the respective resistor retained or accepted. Further, since the two different encoding device positions represent in fact two different conditions, either the positions or the read-out may be employed either directly or indirectly as a signal, or to form a signal, representing the encoded number. The signal would be comprised of a series of signal elements, any element of which would be of one or the other of two different types. For example, one type of signal element could be positive, the other negative; or one type could be absence of flow or of change and the other type occurrence or presence of flow or of change. Such a signal would precisely represent the encoded number and would thus accurately represent the measured value in the given specific example; and the signal could consist essentially of a series of time-spaced signal elements, each individual element being of one or the other of the desired signal element types, and those of one type invariably representing zero value and those of the other type representing a value or weight according to the relative position of the particular signal element in the series. A means for utilizing the positions of the switch elements or encoding devices in formulating a signal precisely representing the encodement of the measure or the encoded number, is provided in the preferred embodiment of apparatus diagrammatically illustrated in the accompanying drawings and hereinafter explained. This means utilizes individual auxiliary circuits, one for each of the encoding devices, the respective auxiliary circuit preferably beng closed by the device when the latter is in its aforementioned second position, and opened when the device is returned to its first position.

In the drawings, which illustrate principally in diagrammatic form a preferred embodiment of apparatus according to the invention.

Figure 1:
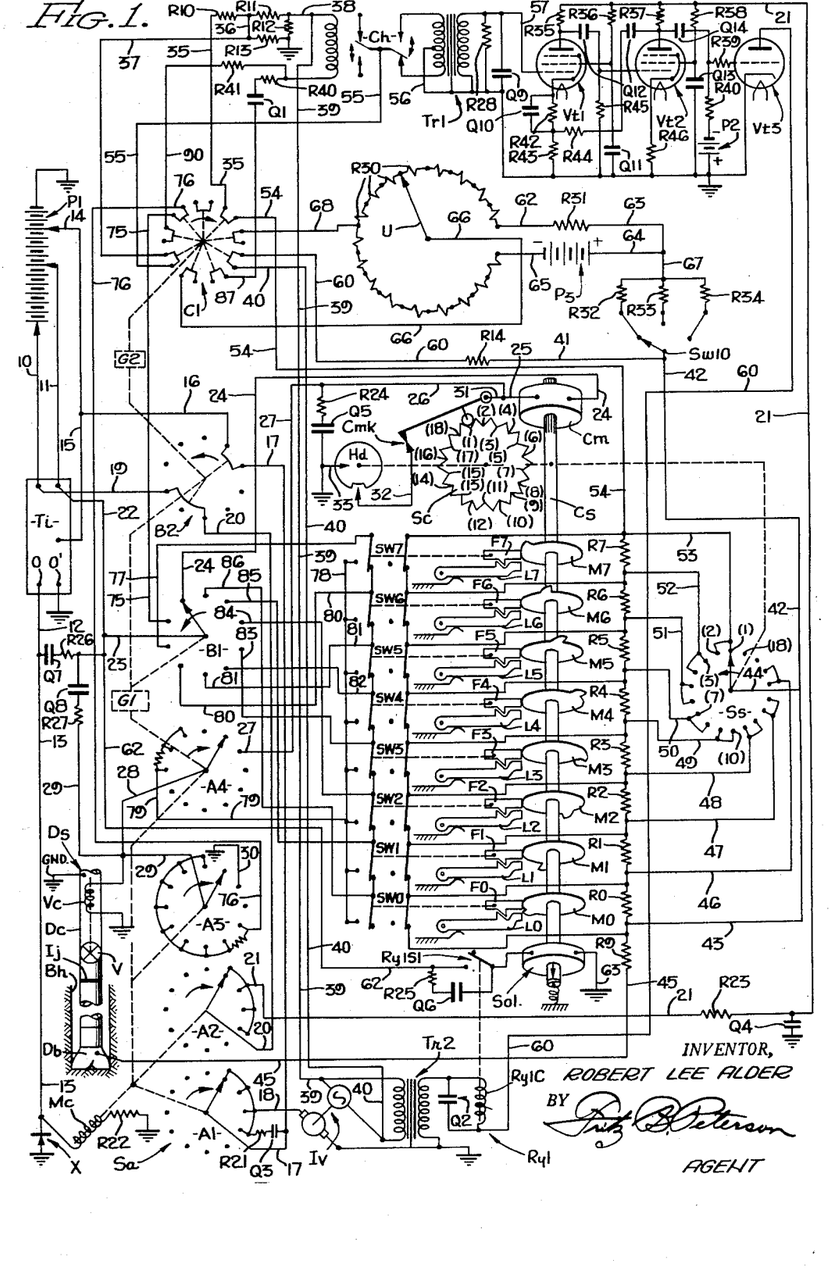
Figure 1 is a diagram principally in the form of an electrical circuit diagram depicting the interconnections of various electric circuit elements used in the preferred embodiment of apparatus and indicating the relationships of the electrical components to mechanical components of the apparatus.

Referring now to Fig. 1 of the drawings, there is illustrated diagrammatically in vertical section the lower end of a typical earth borehole Bh formed in the earth by means including a drill string, a lower end portion of which is indicated at Ds. The lower portion of the drill string may include one or more drill collars Dc, and the drill string is terminated at its lower end by a drill bit Db, the latter being preferably suitably insulated from an upper uninsulated part of the drill string by insulating means including an insulated joint such as is diagrammatically indicated at Ij interposed between adjacent sections of the drill string. The borehole drilling means may, except as hereinafter specifically pointed out, be of any suitable type and per se is not of the present invention. The derrick and other conventional drilling structure is not shown. The other mechanical and electrical apparatus diagrammatically depicted in Fig. 1 is housed principally in a sealed steel container (not shown) suitably supported in a recess or enlarged central passageway formed in one of the sections of the drill string such as, for example, one of the drill collars Dc.

Figures 2, 3, 4, 5, 6, 7:
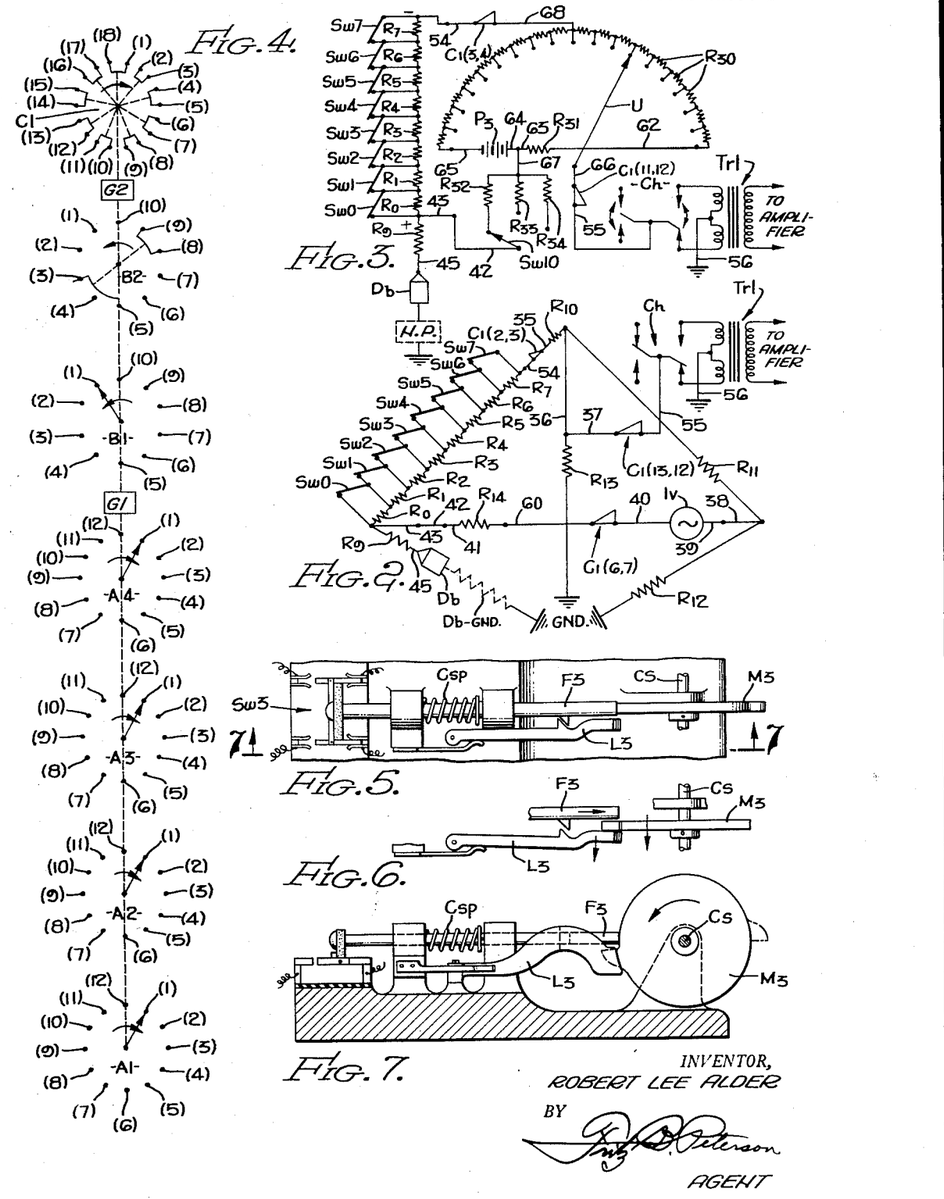
Figure 2 is a simplified circuit diagram of a portion of the apparatus illustrated in Fig. 1 employed in one phase of operations in practice of the invention.
Figure 3 is a simplified circuit diagram of a portion of the apparatus illustrated in Fig. 1 employed in a second phase of operations.
Figure 4 is an explanatory diagram of certain components of apparatus employed in the embodiment of apparatus depicted in Fig. 1.
Figure 5 is a plan view of a fragment of a switch structure capable of performing the comparison-element trying and rejecting functions according to the invention.
Figure 6 is a plan view of a portion of the structure shown in Fig. 5, but in a different operating position.
Figure 7 is a sectional view in elevation of the structure shown in Fig. 5, taken as indicated by the line 7—7 in Fig. 5 with the cam rotated to the operating position indicated in Fig. 6.

A suitable earth connection or electrical ground for the electrical apparatus of the invention may conveniently be provided by an electrical connection to an upper uninsulated and exposed portion of the drill string which is electrically connected to the earth formations through the drilling fluid in the borehole. A suitable source of electric power such as a multi-section battery P1 having suitable taps is provided for furnishing electric power to principal components of the apparatus. Connected to battery P1 by conductors 10 and 11 is a timer device Ti which is operated by power from battery P1 and is used to time the sequential operations of the apparatus as will hereinafter be made apparent. Timer Ti, which may be of any suitable construction, acts to periodically supply to its output terminals O—O' pulses of electric current derived from battery P1, at any suitable cyclical rate. The pulses may be supplied at a rate, for example, of one pulse per second. The pulses of electric current from the output terminals of the timer are applied by the illustrated circuit including conductors 12 and 13, to the driving motor coil Mc of a multi-bank electromechanically operated rotary stepping switch assembly indicated generally by the reference character Sa. Switch assembly Sa is employed to perform a multiplicity of switching functions hereinafter explained in detail. The switch assembly comprises three banks or groups of rotary stepping switch units or wafers, each switch unit or wafer comprising a circular array of switch contacts arranged for contact by one or more rotatable sweep contacts. The lower bank of switch units or wafers of switch assembly Sa comprises four switch units, designated, respectively, A1, A2, A3 and A4, all of which have their sweep contacts mounted on a rotary shaft rotated stepwise by electromechanical means including the driving motor of the switch assembly. The second bank of the rotary stepping switch assembly Sa comprises two switch units or wafers designated B1 and B2, both of which have their sweep contacts on a common rotary drive shaft which is driven by a suitable mechanism such as a Geneva motion G1 which is in turn driven, as indicated by the dotted line, by the rotary shaft of the first bank of switch units. The third bank of assembly Sa comprises a single rotary stepping switch unit or wafer C1 whose rotary sweep or wiping contacts are arranged to be rotated as by a shaft driven by suitable mechanical connection with a second transmission means such as a Geneva motion G2, which in turn is driven by the rotary shaft of the second bank of units. The mechanical interconnections of the driving motor, the Geneva motions, and the several switch units or wafers of switch assembly Sa, are indicated by dotted lines interconnecting the several named components and units, in conventional manner. The mechanical arrangement and construction of the electromechanical drive means is such that each time a pulse of current is supplied to motor Mc, switch units A1, A2, A3 and A4 are synchronously stepped clockwise one contact or station. Thus the sweep contacts of the first bank of units are rotated through one complete revolution in twelve step-by-step movements, there being twelve peripheral contacts or stations in each of the units of the first bank. Construction of the first transmission means or Geneva motion G1 is such that the sweep contacts of the switch units of the second bank are stepped one station or peripheral contact in a counterclockwise direction for each complete revolution of the sweep contacts of the first bank. Thus the sweep contacts of units B1 and B2 make one complete revolution for each ten complete revolutions of the units of the first bank, there being ten stations or peripheral contacts in each of the switches of the second bank. In a similar manner the construction of the second transmission means or Geneva motion G2 is such that the sweep contacts of switch unit C1 are stepped in a clockwise direction one peripheral contact or station each time the sweep contacts of B1 and B2 complete a full revolution. For purposes of facilitating identification the individual peripheral contacts or stations of each of the switch units are designated by a respective number enclosed in parentheses, the numbering being clearly indicated in the explanatory diagram of Fig. 4. Referring to Fig. 4, the twelve peripheral contacts of A1 are designated (1) through (12), respectively, and those of units A2, A3, and A4 are similarly designated, the numbering corresponding to the usual hours designations on the face of a time clock. The sweep contacts of switches A1–A4 are rotated stepwise in a clockwise direction in unison by their common rotary shaft, and are electrically insulated each from the others. The sweep contacts of units A1 to A4 are each indicated by a radially extending arrow directed from the center of a respective circularly disposed array of dots, each of which dots represents a respective one of the peripheral contacts of the unit. Units A1 to A4 may, accordingly, be substantially identical. The peripheral contacts or stations of the units are hereinafter referred to by citing the unit designation followed by the number of the contact or station in parentheses. Thus, the abbreviation A1(7) designates station or contact No. 7 of switch unit A1. The peripheral contacts and sweep contacts of units B1, B2 and C1 are arranged and numbered or designated as indicated in Fig. 4, and in most respects are similar to the comparable elements and characteristics of units A1 to A4, and are hereinafter similarly designated. However, each of units B1 and B2 comprises only ten peripheral contacts and the numbering and rotation of the sweep contacts are counterclockwise as indicated. Unit C1 has eighteen peripheral contacts numbered as indicated in Fig. 4 with the sweep contacts rotating stepwise in a clockwise direction. Unit C1 has nine insulated sweep contacts, each adapted to interconnect two next-adjacent peripheral stations or contacts as indicated. Similarly, unit B2 has two special sweep contacts, one adapted to interconnect two next-adjacent peripheral contacts and the other adapted to interconnect two peripheral contacts separated by one intervening peripheral contact. Except as indicated in Fig. 1, each of the peripheral contacts is insulated from all of the others, and the same is true of the sweep contacts. Any suitable type of rotary stepping switch means may be employed in assembly Sa. For example, the type illustrated in Patent No. 2,496,880 and marketed by G. H. Leland, Inc., Dayton, Ohio, may be employed, suitable transmission means such as Geneva motions being mechanically interposed between adjacent banks of switch units in the manner and for the purpose described and indicated.

From the description of the mechanical construction of the switch assembly Sa thus far set out, it is evident that if electric pulses are supplied to motor Mc at the rate of one pulse per second, the second bank of switch units B1 and B2 will be rotated through one complete revolution each 120 seconds, and the sweep contacts of units C1 will be stepped one station each 120 seconds. Also, it will be evident from the indicated construction of unit C1 that a complete cycle of switching operations will be performed by that unit each two steps. As a consequence of these considerations it is evident that switch assembly Sa performs a complete switching cycle each 240 seconds as long as periodic power pulses are supplied to Mc by timer Ti at the noted rate.

The hereinabove mentioned comparision elements are depicted in the exemplary circuitry indicated in Fig. 1 as a series-connected arrangement of resistors R7, R6, R5, R4, R3, R2, R1 and R0. Each of these resistors is arranged to be short circuited by a shorting element of a respective one of a series of switches Sw7 ... Sw0 when the associated switch element is in its "first position," as shown. Thus the resistor arrangement, and its comparison value, are made variable. Switches Sw7 ... Sw0 are arranged to be operated each in its turn from the first or closed position indicated to a second or open position by means of spring-stressed latch type switch actuating plungers F7 ... F0 (see Figs. 5, 6 and 7) when the plungers are moved each in turn to the left as viewed in the drawings. The plungers are given their translatory switch element opening movements each in its turn by respective cams of a series of plunger operating cams M7 ... M0 mounted on a common camshaft Cs. Further, each of the plungers when thus translated to a switch element opening position is arranged to be retained in that position by a respective one of a series of latches L7 ... L0 which are stressed into plunger latching positions by suitable spring means as diagrammatically illustrated in Fig. 1 and more clearly depicted in Figs. 5, 6 and 7. Cams M7 ... M0 are of like configuration, each having a principal portion of its periphery of constant radius and the other portion constituting a short riser as indicated in Fig. 7, the cam riser being adapted and arranged to engage and impart the switch opening translatory movement to its respective plunger as camshaft Cs is rotated. Each of cams M7 ... M0 is mounted in an individual predetermined position on camshaft Cs; and Cs is arranged for limited axial shifting and also is arranged to be rotated stepwise in the direction indicated by a stepping motor Cm. Motor Cm may be of the commercially available type hereinabove mentioned and used to step the switch assembly Sa, and is constructed and arranged to step through one complete revolution in eighteen discrete steps. Cams M7 ... M0 have their risers so disposed and angularly positioned about camshaft Cs that the riser of cam M7 during two successive steps of motor Cm effects switch-element-opening translation of its respective plunger F7, followed during the next two successive steps of the motor by a like action of the riser of cam M6 on plunger F6, etc., whereby the translatory motions of the plungers F7 ... F0 commence with that of plunger F7 and follow in sequence at two-step intervals. Thus sixteen successive steps of motor Cm are required to complete the leftward switch element opening translatory motions of all of the plungers. The remaining two steps of motor Cm are idle steps insofar as operation of the plungers F7 ... F0 is concerned, but are required for reasons hereinafter more fully explained. After the riser of a cam of the series M7 ... M0 has effected switch element opening translation of its respective plunger during two steps of camshaft rotation, it is, preferably sometime during the last stages of the second step, rotated past and out of engagement with its plunger, thus permitting return translation of the respective plunger if and when the latter is released by its respective latch. This return translation of a plunger to the right is effected by suitable spring means such as the compression spring means Csp illustrated in Figs. 5 and 7. The riser portions of cams F7 ... F0 are preferably so formed that each translates the respective plunger from the first position to the second or switch-open position during part of the allocated two steps of motor Cm, and then disengages from the plunger during the last part of the two-step period. Further, the riser portions of the cams are of such configuration that just prior to opening of the respective switch element and for the next one and one-half steps of the motor the riser of the plunger engaging cam is positioned opposite a depending lobe formed as a part of the respective latch, whereby axial downward translation of camshaft Cs (as viewed in Figs. 1 and 5) will cause the riser of the cam to swing the respective latch member out of latching engagement with its plunger, as indicated in Fig. 6. The lobes of the latches are suitably formed and positioned to be thus engaged and moved by respective cam risers if and when the camshaft is downwardly translated. Thus the structure is of such nature that following switch element opening translation of any one of the plungers, the later is retained in that position by the respective latch means unless camshaft Cs is during the next step and one-half of rotation given an axial latch-releasing translatory movement (downward as illustrated) by a means to be presently described.

Camshaft Cs is mounted for axial translatory motion in motor Cm by suitable means, such as, for example, a splined connection with the armature of motor Cm. Further, the camshaft has suitably secured to it at its lower end a solenoid armature and spring return device of a solenoid device Sol. as indicated in Fig. 1, whereby energization of the solenoid by an electric current pulse will cause translatory movement of the camshaft downwardly as viewed in Figs. 1 and 6, for the performance of the above-mentioned latch releasing function. It should be noted that only one of the latches of the series L7 ... L0 may be disengaged by axial translation of camshaft Cs during any given 40° of rotation of the latter, because of the cam configurations and 40° of angular spacing of the risers of the cams on the camshaft. That is, since axial translation of camshaft Cs occurs only shortly after the riser of a given cam has caused switch opening movement of its respective plunger, the only latch actuated by such axial translation of the camshaft at that time is the latch associated with the just-actuated plunger, all of the other cam risers being at that time angularly displaced from their respective latch lobes. It should also be here noted that axial downward translation of camshaft Cs is effected only in event the just-opened switch element actuated by its associated plunger is to be returned to closed position to reject a just-tried comparison element. Otherwise, the plunger and its associated switch elements are retained in their second positions by the latch. The axial translations of the camshaft are, as noted, caused by energization of reject solenoid Sol.; and the latter is energized only at the required times, by means hereinafter described and explained in detail.

Also arranged for step-by-step rotative actuation by motor Cm, as, for example, by being mounted on camshaft Cs, is a stepping cam Sc. This cam is arranged with a follower face of suitable configuration for operating a follower which in turn is constructed and arranged to open and reclose a pair of homing circuit contacts Cmk once for each step of motor Cm. Thus cam Sc is provided with eighteen lobes or risers, as indicated. Cam Sc, cam actuated contacts Cmk, a homing disc Hd, and a brush contact for the latter, form conventional components of the commercially available motor Cm hereinabove mentioned; and these components of the apparatus are per se not of the present invention.

Also arranged for rotation synchronously with camshaft Cs, as by being mounted on a disc thereon, is the sweep contact of a selector switch Ss having eighteen peripheral contacts as indicated. The purpose and functioning of this switch will presently be made fully evident.

As hereinabove indicated, resistors R7 ... R0 are "tride" or electrically inserted for comparison purposes, each in its turn, in a bridge network in the process of measuring the unknown value of a resistance. In the herein described examplary embodiment of the invention, the unknown resistance value is that of the resistance offered by an earth formation current path between the drill bit Db and a ground connection GND formed by an exposed portion of the drill string Ds remote from and insulated from the drill bit. The exemplary bridge network, traceable on the circuit diagram of Fig. 1, is shown in simplified form in Fig. 2 to which reference may optionally be made for the following explanation of the operation of the apparatus in measuring the unknown value of resistance. All of the apparatus is shown in initial position ready for commencement of operations. As indicated in Fig. 2 the circuit elements comprised in the bridge network may be laid out or depicted in conventional diamond configuration, having upper left, upper right, lower left and lower right bridge network arms connected at junctions as indicated and between opposite junctions of which diagonal connections may be made as indicated. While any suitable arrangement of network units may be employed, and elements of any suitable values in the arrangement shown, the upper left arm of the bridge network includes a resistor R10, conductor 35, switch C1 at stations (2, 3), conductor 54, and a variable series arrangement of comparison resistors R7 . . . R0, the arm terminating at the junction between resistance R0 and a resistor R9. The lower left arm of the bridge network shown includes resistor R9, conductor 45, and the resistance of unknown value presented by the current path between the drill bit D$b$ and the remote ground connection GND, and indicated in Fig. 1 as "D$b$ . . . GND." The upper right arm of the bridge network includes a resistor R11; and the lower right arm of the network includes a resistor R12. In this exemplary bridge network resistors R10 and R11 are of equal ohmic value, and resistors R9 and R12 are likewise of equal value. The vertical diagonal bridge network connection includes conductor 36 and resistor R13 as indicated. The other diagonal bridge network connection, extending between the junction of R0 and R9 on the one hand and the junction of R11 and R12 on the other hand, includes conductors 43, 42, 41, a resistor R14, conductor 60, switch C1 (6, 7), conductor 40, a source of network energizing current represented by the alternator section of an inverter I$v$, conductor 39, and conductor 38. A bridge network output lead is taken from the junction of conductor 36 and resistor R13 by way of a conductor 37, switch C1 (13, 12), conductor 55, the specially polarized contacts of a "chopper" relay C$h$, the lower section of the primary of a transformer T$r$1, and conductor 56, to ground. It will be noted that this bridge network will be balanced if all of the comparison resistors R7 . . . R0 are short circuited and there is zero resistance between the drill bit D$b$ and ground connection GND, and that as a consequence, under this balanced condition no current will flow through resistor R13. If, however, the resistance between the drill bit and the remote ground connection GND is greater than zero in value, as is inevitable, the bridge network will be unbalanced and current will flow through resistor R13 and the parallel circuit including the lower section of the primary of transformer T$r$1. A measurement of the unknown value of resistance between the drill bit and the remote ground connection is obtained by the apparatus by balancing against the unknown resistance an equal or approximately equal value of resistance comprised in the series of comparison elements or resistors R7 . . . R0. It will be evident from a consideration of Fig. 2 that if the resistance included in the upper left arm of the bridge is greater than that included in the lower left arm of the bridge, the polarity of the output voltage applied to the primary of transformer T$r$1 will be opposite that of the voltage which would be applied if the resistance in the upper left arm of the bridge were less than that in the lower left arm. This difference in the polarity of the output voltage or potential of the bridge network is utilized by means hereinafter more fully described, to cause the automatic rejection from the upper left arm of the bridge network of only any and all of resistors R7 . . . R0 which, when tried in the network, cause overbalancing of the bridge network. It will be evident that from the standpoint of simplicity of the bridge or comparison network, R9, R10, R11 and R12 should be chosen of equal resistance value. However, it is equally evident that other ratios of resistances may be employed, it then being important that the particular relationship of resistance values be taken into account in interpreting the results of the measurements performed with the network. With the four mentioned resistors of equal value, a measurement performed by the bridge network results in a number or value directly and accurately indicating the unknown value of resistance to be measured, whereas if a different ratio or arrangement of values of R9, R10, R11 and R12 were employed, the number or value obtained by the measurement would not directly indicate the unknown value, but would bear a definite and known mathematical relationship to the unknown value. In the latter case the unknown value is determinable from the number or value arrived at in the measurement, by proper application of the mentioned mathematical relationship between the two.

In Figs. 1, 2 and 5 the switches and associated apparatus are illustrated in initial positions preparatory to commencement of measuring operations. The inverter I$v$ is supplied with power through switch unit A1 and is operative to energize the bridge network; and the timer T$i$ is energized and supplies stepping pulses to stepping motor M$c$. Power is supplied to C$m$ from P1 by way of 11, 22, 23, B1(1), 24, C$m$, 25, 26, 27, A4(2), 28, 29, A3(2), 30 and GND, as M$c$ steps the A1 . . . A4 switch units to (2). This steps motor C$m$ one step. It will be evident from a consideration of the circuitry indicated in Fig. 1 that at the commencement of the operation of measuring the unknown value of resistance between the drill bit and the remote ground connection, all of resistors R7 . . . R0 are short circuited. This short circuit is effected by the aforementioned selector switch S$s$ and its associated circuits; and this shorting is provided so that any of switches S$w$7 . . . S$w$0 which may have been left in the open (second) position by previous operations, will have no effect on the measuring of the unknown value of resistance. As motor C$m$ steps and switch S$w$7 is opened by operation of its plunger F7 by stepwise rotation of cam M7, selector switch S$s$ is concurrently stepped and acts to unshort resistor R7 at S$s$ as that resistor is also unshorted at S$w$7 by opening of the latter switch. Motor C$m$ is permitted to automatically step by action of contacts C$m$k and disc H$d$ as soon as the initial power supply circuit therefore is opened at A3 as the latter steps from station (2) to station (3). Prior to this action motor C$m$ is continuously energized while A3 is at (2) and hence makes only one step. The arrangement and construction of the apparatus is such that cam M7 effects the opening of switch S$w$7 as the selector switch S$s$ steps from contact or station (2) to contact or station (3). These concurrent unshorting actions leave resistor R7 electrically effective as a resistance in the upper left arm of the bridge network as depicted in Fig. 2. The bridge network being now energized from the output of I$v$, if the value of resistor R7 is such as to result in overbalancing of the bridge network, the polarity of the alternating potential applied by the network output lead 37 to the lower section of the primary of transformer T$r$1 will be such that the output potential of the transformer T$r$1, as amplified by an amplifier including electron tubes V$t$1 and V$t$2 and applied to the control grid of electron tube V$t$3, will be in phase with the alternating current potential applied to the anode of V$t$3. Thus electron tube V$t$3 will be caused to conduct, and a relay R$y$1 will be energized by the tube anode current. Alternating anode potential of proper phase relationship is applied to the anode of V$t$3 from the secondary of a transformer T$r$2 whose primary is connected across the alternating current source represented by inverter I$v$, the potential being applied through the actuating coil R$y$1C of relay R$y$1, and conductor 60. A capacitor Q2 is preferably provided as indicated across coil Ry1C, to provide current through the coil during the negative half cycles when tube Vt3 is not conducting, whereby a "holding" current is supplied to Ry1C. Energization of relay Ry1 causes closure of the relay contact or switch Ry1S1, resulting in energization of the reject solenoid Sol. through the circuit including battery P1, conductors 11, 22, and 62, switch Ry1S1, solenoid Sol., conductor 63 and ground. Energization of reject solenoid Sol. results in a downward axial shifting of cam-shaft Cs, whereby the riser of cam M7 contacts and shifts the end lobe of latch L7, swinging or moving the latch to release plunger F7, which, due to the downward or rotational movement of the riser of cam M7, now clears the cam. This permits the compressed spring Csp of the plunger to return the plunger and switch Sw7 to first or closed position, in which resistor R7 is again short circuited. This action including the return of Sw7 to closed position constitutes a rejection of resistor R7. As selector switch Ss steps to station (3) to remove the short circuit from resistor R7, the riser of cam M6 commences movement of plunger F6 for the opening of switch Sw6 preparatory to insertion or trial of resistor R6 in the balancing arm of the bridge network. When motor Cm steps selector switch Ss from station (4) to station (5) to remove the selector switch short circuit from resistor R6, switch Sw6 is moved to second or open position, likewise removing its short circuit from R6 and effectively inserting that resistor in the bridge circuit. Assuming for purposes of illustration that the thus inserted and tried resistor R6 is of ohmic value insufficient to cause the bridge network to be overbalanced, the polarity of the bridge network output voltage applied to the primary of transformer Tr1 will be opposite to that of the previously applied voltage when resistor R7 was tried in the network. As a result of this change in polarity the polarity of the alternating voltage applied to the control grid of tube Vt3 will be 180° out of phase with the voltage applied to the anode of that tube, with the result that the tube will remain nonconducting. (Tube Vt3 is biased by the battery P2 so as to be normally nonconducting.) As a consequence of the continued nonconducting status of Vt3, relay Ry1 will at this time not be energized, contacts Ry1S1 will not be closed, and reject solenoid Sol. will not be energized to shift cam-shaft Cs, with the result that latch L6 will retain plunger F6 in extended position with switch Sw6 in its second or open position. This action (or lack of action) constitutes acceptance of R6 and causes retention of the latter in the bridge network, since further stepping of selector switch Ss leaves R6 unshorted and unchanged in status. The above-described operations are, in general, repeated with respect to resistors R5, R4, R3, etc., as motor Cm continues to rapidly rotate the camshaft Cs and selector switch Ss in stepwise fashion. As each of the remaining comparison resistors is tried in the balancing arm of the bridge network, it is either rejected from the network by being short circuited by reclosure of its associated switch through operation of the reject solenoid, or is accepted and retained in the bridge network by lack of energization of the reject solenoid. Rejection occurs if inclusion of the resistor in the network results in the latter becoming overbalanced; and acceptance occurs if such inclusion results in the network becoming balanced or remaining underbalanced. It will be noted that as resistors R5, R4, R3, etc., are tried in the balancing arm of the bridge network, each is tried therein effectively in series with previously retained resistor R6 and also in series with any other previously retained resistor of the series. It will also be noted that selector switch Ss removes its short circuit from the last resistor of the series, (R0), at the time the sweep contact of the selector switch steps from station (16) onto the idle peripheral contact at station (17); and that as the selector switch sweep contact is subsequently stepped from station (18) to station (1) (as pictured in Fig. 1), the selector switch again effectively short circuits all of the comparison resistors regardless of the positions of switches Sw7 . . . Sw0. Also, as the selector switch Ss reaches station (1), automatic operation of stepping motor Cm is suspended by arrival of the gap in the homing disc Hd over the brush contact of the motor homing device which opens the power supply circuit of the motor. The latter power supply circuit shifted from conductors 26, 27, etc., to disc Hd and conductor 33 as motor Mc stepped units A1 . . . A4 from stations (2) to stations (3), during stepwise operation of motor Mc. Thus Cm automatically stops itself and its driven elements in their initial positions, ready for another cycle of operations. It will be noted that all of the switches Sw7 . . . Sw0 associated with the retained resistors of the series R7 . . . R0 remain in second or open position, thus leaving their associated resistors unshorted at those switches; but as previously indicated, all of the comparison resistors of the series are at this time effectively short circuited by selector switch Ss.

VALUE CODING OPERATIONS OF CODING SWITCH

In moving respective switches Sw7 . . . Sw0 from the first to the second position the plungers F7 . . . F0 move respective encoding switch elements from open circuit positions to circuit-closing positions, as is evident from Figs. 1, 5 and 7. The associated encoding switch elements thus moved may be, as indicated in Figs. 5 and 7, parts of switches Sw7 . . . Sw0, and are employed in the invention for encoding purposes in the manner and fashion hereinabove indicated. It will be apparent from the previously explained operation of the apparatus that any rejected comparison resistor has its associated encoding switch element returned from the second to the initial or first position as that resistor is rejected. Conversely, any accepted comparison resistor has its associated encoding switch element retained in its second position wherein it effectively closes an auxiliary circuit employed in formulating a coded signal representative of the encoded measure-representing number indicative of the value of the measured value of resistance. These features and operations will hereinafter be more fully described and explained.

SIGNALING

Signals formulated by the apparatus are, as hereinabove indicated, transmitted from within the borehole to the surface of the earth preferably by means of flow or pressure variations in the stream of drilling fluid flowing downwardly through the interior of the drill string Ds, and/or by absence of such flow or pressure variation at a prescribed time. As indicated in Fig. 1, these flow or pressure variations are effected by operation of an electromagnetically actuated valve V of any suitable construction and which is actuated from one condition to another by energization of an associated valve solenoid coil Vc, the valve being thereafter returned to its initial condition by automatically acting spring means comprised in the valve structure. Valve V is interposed in a part or all of the drilling fluid stream in the drill string, depending upon design factors. The transmitted signals preferably are of at least two classes, the first class comprising synchronizing signals, and the second, information or measurement value-representing signals. Each signal, which is spaced apart in time from all the other signals, comprises one or more separate signal elements, each signal element being of one or the other of two signal element types, one type being of the form or character of the above-mentioned pressure or flow change in the drilling fluid stream, and the other type being a lack or absence of such change. While synchronizing signals are not absolutely necessary, they may be of great value in correlating operation of signal receiving and/or recording apparatus at the accessible location (such as at the surface of the earth), with the operation of the signal transmitting apparatus at the inaccessible location (such as at the bottom of the borehole); and such synchronizing signals are herein preferably employed. Preferably, and as hereinafter disclosed in detail, the apparatus of the invention periodically transmits a synchronizing signal of a distinctive characteristic, such as, for example, of unusual duration. The synchronizing signal is followed after a measured period of time by a multielement information bearing signal representing, for example, a value of resistance. The first multi-element signal in turn may be, and preferably is, followed by a second multielement signal representing, for example, a measured value of potential. The signal elements comprised in each signal may include elements of one or both of the two different types hereinabove mentioned. What may for convenience be termed positive signal elements, (+), are transmitted by the apparatus of the invention as pressure changes in the drilling fluid stream, in which case the negative signal elements, (—), are formulated as absence or lack of any such pressure change. The synchronizing signals, which preferably are transmitted at a rate of one synchronizing signal for each complete signaling cycle of the apparatus, are preferably always comprised of one positive signal element of extra long duration. Following transmission of the synchronizing signal and spaced therefrom by measured periods of time are the signal elements comprised in the information or value-representing signals. Thus, in a signaling period commencing with the commencement of a synchronizing signal, each information or value-representing signal element is assigned a precisely allocated and determined period of time. If during that period of time a positive signal element is formulated, it represents a definite numerical value in accordance with its relative position in the information-representing signal, but if the element is of negative character, it invariably represents a zero value regardless of position in the signal.

The characteristics and modes of formulation of the synchronizing and information or value-representing signals will become fully evident from a consideration of the tabulation of sequence of operation of the apparatus hereinafter set forth.

NATURAL POTENTIAL (N.P.)

Measurement of an unknown value of voltage or potential (in this example an unknown value of potential existing between drill bit D$b$ and the remote ground connection) is effected by means including the previously described operating and circuit elements of the apparatus, with the conversion of some elements of the bridge network into elements of a potentiometer network. The potentiometer network, shown in simplified form in Fig. 3, comprises means for converting the comparison elements represented by resistors R7 . . . R0 into voltage comparison elements by establishing across those resistors respective voltage drops which may be compared with the unknown value of voltage to be measured. Since the particular value of voltage to be measured in this specific example, and by the disclosed embodiment of apparatus of the invention, is subject to variation in polarity and over different ranges in values, means are provided by the potentiometer network for establishing an adjustable but known reference voltage for comparison with the unknown voltage.

Referring to Figs. 1 and 3, a series-connected array of equal-valued resistors R30 is provided with suitable switch taps between adjacent units of the resistors, the endmost taps being interconnected by a circuit including conductor 65, a battery P3, conductors 64 and 63, resistor R31 and conductor 62. Resistors R30 are preferably eighteen in number, as indicated in Fig. 3, and are each of relatively low ohmic resistance, as for example, ten ohms. By virtue of the arrangement described, a flow of current is induced through the series connected resistors by the potential of battery P3, whereby there is produced across each of the equal-valued resistors R30 a potential drop. The circuit constants of this circuit are preferably so chosen that the potential drop across each of the resistors R30 is equal to 100 millivolts. A slider contact U is adapted to be moved into contact with any one of the several taps between resistors R30. Connected to the midpoint tap between resistors R30 is a series circuit comprising conductor 68, switch C1 (3, 4) conductor 54, the series arrangement of resistors R7 . . . R0, resistor R9, conductor 45, drill bit D$b$, and the earth potential existing between the drill bit D$b$ and the remote ground connection, and indicated in Fig. 3 by the dotted line enclosure designated "N.P." Connected between the junction of conductors 63 and 64 and the junction of resistors R0 and R9 is a series circuit including conductor 67, a selected one of a series of three resistors R32, R33 and R34, a switch S$w$10, and conductors 42 and 43. The ohmic value of each of resistors R32, R33 and R34 is high relative to the resistance of resistors R30, and of the series connected comparison element resistors R7 . . . R0, whereby voltage drops caused by various selections of the resistors R7 . . . R0 and of resistors R30 will have negligible effect on the voltage drops across resistors R30. For example, the ohmic values of resistors R32, R33 and R34 may be, respectively, 50,000, 100,000 and 200,00 ohms, with resistors R7 . . . R varying from 640 ohms to 5 ohms in value according to the previously mentioned formula, and with resistors R30 of 10 ohms value each. Connected between slider U and ground is a series circuit including conductor 66, switch C1 (11, 12) conductor 55, contacts of a polarized chopper relay C$h$, and one or the other of the primary sections of transformer T$r$1, conductor 56, and ground. It is evident from the described circuitry that there is produced across each of resistors R7 . . . R0 a potential drop which is proportional to the ohmic value of the particular resistor; and that the values of these potential drops will be substantially the same irrespective of how many and which of the series of resistors is short-circuited. These considerations follow by virtue of the relatively high resistance of the resistor R32 relative to the other resistances in the circuit. Thus a variable arrangement of voltage comparison elements is provided. Thus it is seen that in the relatively low resistance series circuit from ground through the drill bit, resistor R9, resistors R0 . . . R7, conductors 54 and 68 and slider U, and on to ground through conductors 66 and 55 and the chopper relay C$h$, there are three potentials, two of which act in opposition to the other. The first of these potentials is the earth or natural potential between the drill bit and the remote ground connection; the second is the potential drop across the arrangement of resistors R7 . . . R0; and the third is the voltage drop across three of resistors R30 as indicated. At the commencement of the measuring operations slider U is preset to provide a potential between the slider and the midpoint tap of the series of resistors R30, of the proper polarity and magnitude to cover the expected range of potentials of unknown value between drill bit D$b$ and ground. Similarly, selector switch S$w$10 is preset to connect into the circuit one or the other of resistors R32, R33 and R34 to provide the desired range of comparison voltage values across the arrangement of resistors R7 . . . R0. Assuming, for example, that with the circuit elements having values as indicated in the accompanying table and that a natural potential between drill bit D$b$ and ground of unknown value in the range between zero and 300 millivolts is to be measured, and that the natural potential is negative at the bit with respect to ground, slider U will be set three units to the right past the midpoint tap to provide positive 300 millivolts between the slider and the midpoint tap, and selector switch S$w$10 will be set to the left to include the 50,000 ohms resistor R32 in the circuit, whereby during the measuring operation the natural potential plus the potential drop across resistors R7 ... R0 will oppose the 300 millivolt drop across the three effective units of resistors R30 as indicated. With the circuit elements of values as indicated in the accompanying table, the comparison potential drop across resistors R7 ... R0 when effective in series will be equal to approximately 330 millivolts; the respective individual voltage drops being approximately 166, 83, 41.5, 20.8, 10.4, 5.2, 2.6 and 1.3 millivolts. Continuing the illustrative example, it will be assumed that a natural potential of 191 millivolts exists at the time a measurement is to be effected. By operations similar to those previously described with respect to the resistance value measurement, the potential drop across resistor R7 will first be tried in the network, and that potential being less than the unknown potential of 191 millivolts, will be accepted. Next, the potential drop of 83 millivolts across resistor R6 will be tried; and will be rejected, since when added to that across previously tried resistor R7, the total inserted comparison voltage is 249 millivolts, in excess of the 191 millivolts to be measured. Similarly, the potential drop across resistor R5 will be tried in the potentiometer network and will be rejected because of overbalancing of the potentiometer network. Next, the potential across resistor R4 will be tried, and this potential will be accepted, since together with the previously accepted potential of 166 millivolts, the total comparison voltage is less than the voltage to be measured. In a similar fashion the potential drops across resistors R3, R2, R1 and R0 will be tried in the potentiometer network, each in its turn, and the potential drops across resistors R3 and R2 will be rejected and those across R1 and R0 will be accepted. Thus, it will be noted that the potential drops across comparison elements 7, 4, 1 and 0 (resistors R7, R4, R1 and R0), have been accepted, while those across comparison elements 6, 5, 3 and 2 (resistors R6, R5, R3 and R2), have been rejected. Integrating or totalling the voltage drops across the accepted elements, it will be found that the total effective comparison voltage is 190.7 mv., which is the value of the "unknown" natural potential, as measured. This measurement, it will be noted, is within ±½ of the potential across the lowest-valued comparison element R0. The accuracy of the measurement is, as previously noted, within one-half the value of the lowest comparison element value.

From the above description of the comparison network as constituted to measure resistance and voltage it may be seen that the arrangement of the comparison elements is variable to provide a varying comparison value to be matched against the unknown value to be measured; and that variation of the arrangement to provide a variety of comparison values is effected by opening of switches $Sw7$ ... $Sw0$ and possibly reclosing of any or all of the latter.

Details of step-by-step operation of the described embodiment of apparatus in performing the measurements of unknown values of resistance and potential, concurrently with each measurement encoding a number accurately representing the value measured, and formulating and transmitting a signal precisely representing the encoded number, are, inter alia, set out and further explained in the following tabulation of sequential operations of the apparatus. In the tabulation, operational periods are of one second duration, the first period is that in which units of switch assembly $Sa$ are in positions indicated in Fig. 1.

*Tabulation of sequential operations of the apparatus*

| Period | A1–A4 Station | Operations, Etc. |
| --- | --- | --- |
| 1 | 1 | Inverter $Iv$ is set in operation by closure at A1 of the circuit: GND, P1, 14, 16, B2(8, 9), 17, A1(1), 18, $Iv$ and ground. Thus energized, the inverter will continue to operate during stepping of A1 through stations or contacts (1), (2), (3) and (4). Plate voltage is applied to amplifier tubes $Vt1$ and $Vt2$ from P1 via the circuit: P1, 10, 19, B2(3–5), 20, A2(1), 21, $Vt1$ and $Vt2$. This application of plate voltage likewise continues for the four-second interval A2 is stepping through stations (1), (2), (3) and (4). |
| 2 | 2 | The inverter being in operation, alternating current output therefrom will be supplied to energize the bridge circuit or network by means of the previously mentioned diagonal series circuit including conductors 43, 42, 41, resistor R14, conductor 60, switch C1 (6, 7), conductor 40, the inverter output, and conductors 39 and 38. The operations of measuring the unknown value of resistance, and encoding of a number representing the value, are commenced, power being supplied to camshaft motor $Cm$ from P1 by way of 11, 22, 23, B1(1), 24, $Cm$, 25, 26, 27, A4(2), 28, 29, A3(2), 30, and GND. This circuit is through only the motor coil of $Cm$ and bypasses the homing disc $Hd$, whereby motor $Cm$ is continuously energized and makes only one forward step. As motor $Cm$ and the camshaft advance this one step, the wiper contact of selector switch $Ss$ steps from (1) to (2), and the automatic homing or continuous stepping circuit of $Cm$ is rendered active by closure of the circuit including 25, 31, $Cmk$, 32, homing disc $Hd$, 33 and GND. Closure of this homing circuit cannot, however, yet cause stepwise operation of motor $Cm$, since the latter continues to be energized and held through the previously outlined circuit. During this period cam M7 has commenced translation of plunger F7, but the latter has not yet been moved sufficiently to open switch $Sw7$. |
| 3 | 3 | Stepping of A4 and A3 from (2) breaks the initially closed circuit through motor $Cm$ and allows the latter to rapidly rotate stepwise until the above-mentioned homing circuit through homing disc $Hd$ is there opened. It is during this period of rapid stepwise rotation of motor $Cm$ that measurement of the unknown value of a resistance, and encodement of a number representing the value, are performed. Rotation of motor $Cm$ may be, and conventionally is, as rapid as twenty to thirty steps per second. Energization of $Cm$ during this period of rapid stepwise rotation is from battery P1 via the circuit: P1, 11, 22, 23, B1(1), 24, $Cm$, 25, 31, $Cmk$, 32, $Hd$, 33 and GND. As motor $Cm$ rotates, cams M7 ... M0 operate to open their associated switches each in its respective turn to try the associated resistors in the bridge network, and each switch is either retained in the open (2nd) position if its associated resistor is accepted, or is reclosed to the first position by energization of the reject solenoid Sol. if the resistor is rejected; the selector switch $Ss$ insuring that all of the yet-to-be-tried resistors are short-circuited, regardless of whether or not their switches are in the second position because of previous operations. Thus, by action of selector switch $Ss$ previous operations and positions of switches $Sw7$ ... $Sw0$ are rendered of no consequence. Operation of the switches $Sw7$ ... $Sw0$ and the rejection or acceptance of their associated resistors occur in the |

*Tabulation of sequential operations of the apparatus*—Continued

| Period | A1–A4 Station | Operations, Etc. |
|---|---|---|
| 3 | 3 | manner hereinabove described. The left-hand or encoding switch elements of switches Sw7 . . . Sw0 indicated in Fig. 1 are left in auxiliary-circuit closing position, or in auxiliary-circuit opening position, according to whether the associated comparison resistor was, respectively, accepted or rejected. It will be noted that during this period during which measurement of the unknown resistance value and encodement of a number representing it are effected, the contacts of chopper relay Ch are in the position indicated in Figs. 1 and 2. This chopper relay is of a polarized type, and means hereinafter more fully described and explained are provided to insure that the contacts of the relay will be in the position indicated for the measurement of the unknown value of resistance, whereby the output voltage of the bridge network as passed through transformer Tr1 will be of the correct phase relationship with respect to the anode voltage on Vt3. Chopper relay Ch is not operated, that is, it is quiescent, during the measurement of the unknown value of resistance; but is operated by means hereinafter fully described during the period in which measurement of the natural potential is effected. |
| 4 | 4 | The actions governed by switch units A1 and A2 may continue during this period. Otherwise the apparatus is functionally idle. |
| 5 through 7 | 5 through 7 | As unit A1 steps from (4) to (5) current supplied to inverter Iv is cut off and inverter operation thereby suspended. Similarly, by action of unit A2, plate potential to the amplifier tubes is cut off at the same time. Otherwise these periods are functionally idle. |
| 8 through 12 | 8 through 12 | During these periods the switch units A1 to A4 are stepped idly without performance of functions other than timing. |
| 13 | 1 | As motor Mc steps switch units A1 through A4 from (12) to (1), the transmission mechanism or Geneva motion G1 steps units B1 and B2 one step in a counterclockwise direction. Units B1 and B2 are thus advanced to station (2) where they remain during the next revolution of units A1. . . A4. As a consequence of the stepping of units B1 and B2 from (1) to (2), the supply of driving power to inverter Iv through switch unit A1 and the supply of plate potential to the amplifier tubes through switch unit A2 will not be accomplished, due to the opening of these supply circuits at unit B2. Similarly, supply of stepping power to motor Cm cannot be effected because of opening of the supply circuits at unit B1. Accordingly, this period is an idle period as far as active operations are concerned. |
| 14 | 2 | This period is idle. |
| 15 | 3 | Idle period. |
| 16 | 4 | Power is supplied from battery P1 through conductors 11, 22, 23, unit B1(2), 75, switch C1, 76, A3(4), 29 and through Vc to ground whereby valve coil Vc is energized and valve V is operated to commence transmission of a positive signal element in the form of a flow change in the drilling fluid stream. The signal element thus commenced is to constitute a synchronizing signal of nine seconds' duration. The mentioned circuit is continued as units A1 . . . A4 step through stations (5), (6), (7), (8), (9), (10), (11), and (12). At station (4), unit A3 supplies power to Vc at full voltage, but at succeeding stations the power is supplied through a resistor included in the A3 unit, whereby Vc receives full power for initial actuation and thereafter during the "holding" period the power is diminished to conserve power. |
| 17 through 23 | 5 through 11 | Creation of the synchronizing signal continues. |
| 24 | 12 | Units B1 and B2 are stepped from station (2) to station (3). Formulation and transmission of the nine-second synchronizing signal is terminated at the end of this period by stepping of unit A3 from (12) to (1), this action serving to open the power circuit through Vc. |
| 25 through 32 | 1 through 8 | Idle periods. |
| 33 through 35 | 9 through 11 | Switch unit B1 being at this time at station (3), power is supplied from battery P1 through 11, 22, 23, unit B1(3) and 77 to the encoding switch element of switch Sw7. If the latter has been returned to its first position, corresponding to the rejection of resistor R7, no action occurs. If, however, resistor R7 was accepted and the encoding element of switch Sw7 is in its second position, current will flow therethrough and through 78, 79, unit A4(9, 10, 11), and 28 to valve coil Vc whereby the valve V will be actuated to transmit a positive signal element as the first signal element of the signal to represent the encoded number representing the value of the resistance measurement. If, of course, resistor R7 has been rejected, valve V will not be actuated, and a negative signal element will be formulated, representing zero value as hereinabove explained. The signal element period is of three seconds' duration corresponding to the period when unit A4 is at stations (9), (10) and (11), and occupies periods 33, 34 and 35 of the complete cycle of operations. It will be noted that the positions of the encoding elements of switches Sw6 . . . Sw0 will at this time be of no consequence, since their auxiliary circuits are opened at switch unit B1 (4, 5, 6, 7, 8, 9, 10). It should be noted that at A4(9), power is supplied directly to the valve coil; but that at A4(10) and A4(11) the power is supplied through a resistor included in the A4 unit between stations (9) and (10). Thus full power is applied initially to move the valve, and then the power is reduced during the "holding" period, to save power. |
| 36 | 12 | Switch units B1 and B2 are stepped from (3) to (4). |
| 37 through 44 | 1 through 8 | These are idle periods spacing the time period of signal element #2 from that of signal element #1. |
| 45 through 47 | 9 through 11 | Switch unit B1 being now at (4), power may be supplied from energized or "live" unit B1 through a conductor 80 to the encoding element of switch Sw6. If the latter is in its first position, no further action ensues; however, if that switch element is in its second position, corresponding to acceptance of resistor R6, current will flow on through the encoding element of switch Sw6 and conductors 78 and 79, through A4 and 28 to valve coil Vc, to again actuate valve V to produce and transmit a positive signal element during the time period assigned to signal element #2 of the resistance value representing signal. Again, as before, |

*Tabulation of sequential operations of the apparatus*—Continued

| Period | A1-A4 Station | Operations, Etc. |
|---|---|---|
| 45 through 47 | 9 through 11 | if resistor R6 has been rejected, a negative signal element will be formulated by failure of valve V to be actuated. |
| 48 | 12 | Switch units B1 and B2 are stepped from (4) to (5) |
| 49 through 56 | 1 through 8 | These constitute idle periods separating the aforementioned second signal element from the third signal element of the signal representing the resistance measurement. |
| 57 through 59 | 9 through 11 | Switch unit B1 being now at (5), power is available to the encoding element of switch Sw5 from switch unit B1 by way of a conductor 81, whereby either a positive signal element or a negative signal element may be formulated and transmitted, according to the position of switch Sw5, all in a manner now evident. |
| 60 through 71 | 12 through 1 and 11. | During this interval B1 steps from (5) to (6) and supplies, at the proper interval, power through conductor 82 to the encoding element of switch Sw4; and the fourth signal element of the resistance measurement value representing signal is formulated, and transmitted if positive in character. These actions occur in a manner similar to those above outlined for resistance measurement signal elements 1, 2 and 3, and in a fashion now evident. |
| 72 through 120 | 12 through 12 | During this interval switch unit B1 is stepped through stations 7, 8, 9 and 10 to supply power successively through conductors 83, 84, 85 and 86, to respective of switch encoding elements of switches Sw3 ... Sw0; and signal elements numbers 5, 6, 7 and 8 of the signal representing the resistance measurement are formulated and transmitted if positive in character. It will be noted that during this interval stepwise rotation of switch unit B2, which occurs concurrently with like stepwise rotation of switch unit B1, is of no consequence, since the two wiper contacts of switch unit B2 are of unlike character and hence incapable of closing the same circuit or circuits. The end of this interval marks the end of a 120 second period of time during which the apparatus has effected a measurement of an unknown value of resistance, encoded according to a mathematical number representing system or code a number representing the measure of the value, and thereafter formulated and transmitted signals comprising a synchronizing signal of nine seconds' duration and a coded value-representing signal. The synchronizing signal was followed at respective intervals of predetermined duration by the eight formulated signal elements of the value-representing signal. The eight signal elements constituted a coded signal precisely representative of the aforementioned number and accurately representative of the measured value of resistance. As is now evident, those signal elements of positive character represented according to their relative positions in the overall signal certain individual weights or values; while those signal elements of negative character represented in each case a weight or value of zero. |
| 121 | 1 | As switch units A1 through A4 step from (12) to (1), Geneva motion G1 steps switch units B1 and B2 from (10) to (1), and transmission means or Geneva motion G2 steps the wipers of switch unit C1 one step or station in a clockwise direction. Thus the apparatus connected to and controlled by switch units A1 ... A4 and B1 and B2 are brought into the positions and conditions corresponding to those occupied or assumed at the commencement of the aforementioned 120 second period of time. As will presently be made clear, stepwise rotation of switch init C1 one step in a clockwise direction serves to prepare the apparatus for and initiate operations whereby resistor units R7 ... R0 are converted into potential comparison elements, and the aforedescribed potentiometer network including the potential comparison elements is connected in lieu of the resistance bridge network all in a manner hereinbefore indicated. Thus it will be noted that as unit C1 steps one step clockwise, the resistance bridge network circuit between R7 and R10 by way of conductors 54 and 35 is disrupted (the contact arm of C1 that previously connected conductors 54 and 35 having shifted one step clockwise and now connecting conductors 54 and 68); the bridge network energizing circuit comprising the diagonal including the inverter Iv and resistor R14 is disrupted at a point between the inverter and R14 (between conductors 40 and 60); and the bridge network output circuit is disrupted between conductors 37 and 55. These three circuit disruptions (easily traced on Figs. 2 and 3) serve to disconnect the resistance bridge network from the contacts of the chopper relay Ch, serve to disconnect the power supply from inverter Iv to the bridge network, and serve to isolate the comparison elements R7 ... R0 from the remainder of the bridge network. Concurrently with these circuit disruptions the upper end of the series of comparison elements R7 ... R0 is connected by way of conductor 54 through C1 (3, 4) and conductor 68 to the midpoint tap of the potentiometer network, and slider U and conductor 66 are connected through C1 (11, 12) to conductor 55 and thereby to the contacts of chopper relay Ch. Also, the output of the inverter Iv as supplied through conductor 40, is connected at C1 (7, 8) to conductor 87 which in turn supplies alternating current power through capacitor Q1 and resistor R40 to the vibrator coil of the chopper relay Ch; and a chopper relay polarizing circuit through resistor R41 and conductor 90 is closed at C1 (15, 16) through to conductor 75, whereby at a subsequent time in the sequence of events (see period 133), chopper relay Ch will be properly polarized and its contacts left in the proper position for accomplishing correct phasing of the connection of the bridge network output to the input or primary of transformer Tr1. |
| 121 | 1 | Operations of the apparatus controlled by switch units A1 ... A4, B1 and B2 are initiated or commenced exactly as they were in period 1. However, as hereinabove noted, due to the one step rotation of switch unit C1, the potentiometer network diagrammatically indicated in Fig. 3 replaces the aforementioned bridge network circuit diagrammatically indicated in Fig. 2. Also as may be traced on Fig. 1, at this time power is supplied from the inverter Iv through conductor 40, switch unit C1 (7, 8), conductor 87, capacitor Q1 and resistor R40 to the vibrator coil of chopper relay Ch, the power return being through conductor 39 to the inverter output. Thus the contacts of the chopper relay Ch are caused to operate synchro- |

*Tabulation of sequential operations of the apparatus*—Continued

| Period | A1–A4 Station | Operations, Etc. |
|---|---|---|
| 121 | 1 | nously with the alternating current output of the inverter $Iv$. Provision of, and operation of the chopper relay $Ch$, during measurement of an unknown value of natural potential is rendered necessary by the fact that the output voltage of the potentiometer network is direct current which must be commutated and transformed by the transformer $Tr1$ to form an alternating voltage for application to the amplifiers $Vt1$ and $Vt2$ to provide an alternating voltage input to tube $Vt3$ of the proper phase relationship with respect to the anode voltage applied to the latter, to cause tube $Vt3$ to conduct or to fail to conduct, according to whether the active potential comparison element is respectively rejected or accepted as the comparison elements are tried in the potentiometer circuit. In other words, the polarity discriminating device comprising tube $Vt3$ must be provided with an alternating input potential if it is to function. It was noted during the measurement of the resistance value that energization of the bridge network was by alternating potential furnished directly by the inverter $Iv$; whereas, in the case of the potentiometer network the latter is energized by direct current potentials and its output voltages are in the form of positive or negative direct (d.c.) potentials. The direct potential provided by the potentiometer output is "chopped" by relay $Ch$, and thus the transformer, $Tr1$ provides an equivalent alternating potential output. Capacitor Q1 and resistor R40 provide means for adjustably controlling the relative phasing of the chopper relay with respect to the anode potential applied to tube $Vt3$. |
| 122 through 131 | 2 through 11 | During this interval, measurement of the value of the natural potential in the earth existing between the drill bit $Db$ and ground is effected in a manner hereinabove explained, by comparison to the voltage drops across the resistors R7 . . . R0 with that natural potential. Concurrently, encoding of a number representing the measured value of the natural potential is accomplished. As in the case of the measurement of the unknown value of resistance, measurement and encoding of a number representing the value of the natural potential is effected by successive operations of switches $Sw7$ . . . $Sw0$ in a manner now evident. This interval ends, therefore, with the encoding switch elements of switches $Sw7$ . . . $Sw0$ in positions encoding the number representing the unknown value of natural potential. |
| 132 | 12 | Idle period. |
| 133 | 1 | Switch unit B1 is now at (2). As a consequence of this positioning of switch unit B1, direct current flows from battery P1 through conductors 11, 22, and 23 through B1 (2) and conductor 75, through switch unit C1 (16, 15) and conductor 90 and resistor R41 through the vibrator coil of chopper relay $Ch$ and on through conductor 38 and resistor R12 to ground. This flow of direct current through the vibrator coil of the chopper relay is in such direction as to position or bias the contacts of the chopper relay into the positions indicated in Figs. 1 and 2; whereby the chopper relay contacts are in proper position for subsequent operation of the apparatus in again measuring an unknown resistance value. It will be understood that at the termination of operation of the inverter after completion of measurement of the natural potential, the contacts of the chopper relay could come to rest in either of two positions, in one of which the phasing of the bridge network output would be incorrect for proper operation of the apparatus. The actual time at which the polarization of chopper relay $Ch$ is effected is immaterial as long as it occurs subsequent to final encodement of the number representing the natural potential value and prior to commencement of measurement and encodement of the unknown value of resistance. The polarization current flow through the vibrator coil of the chopper relay during the entire twelve-second interval that switch unit B1 is at (2). Subsequent stepping of the latter from (2) interrupts the polarization current in an obvious manner. |
| 144 | 12 | This period marks the end of period of polarization of the chopper relay contacts. The chopper relay contacts are left in the positions indicated in Fig. 1. |
| 145 through 152 | 1 through 8 | These are preparatory periods preceding formulation and transmission of the first signal element of the signal representing the measured value of natural potential. The latter signal is the second information signal of the signalling cycle. |
| 153 through 155 | 9 through 11 | During this period the first signal element of the second information signal, representing the measured value of the natural potential, is formulated, and transmitted if positive in character. Formulation and transmission of this signal element is identical with that described for periods 33 through 35 hereinabove. The signal element is of three-seconds' duration and is positive if the potential across resistor R7 was accepted; and negative if that potential was rejected. |
| 156 | 12 | Idle period. |
| 157 | 1 | Switch units B1 and B2 are stepped from (3) to (4) as in period 36 hereinabove. |
| 158 through 164 | 2 through 8 | These are idle periods similar to periods 38 through 44. |
| 165 through 167 | 9 through 11 | The action during these periods is similar to that occurring in periods 45 through 47, except of course that the signal elements now being formulated and transmitted are parts of a signal representing the value of a measure of natural potential. |
| 168 through 229 | 12 through 11 | Signalling of the encoded number representing the measure of the natural potential proceeds during this interval in a manner similar to that set out with respect to the signalling of the number representing the value of the unknown resistance as detailed in the sequence of operations during periods 48 through 109. |
| 241 | 1 | This period marks the commencement of a repetition of the hereinabove described cycle of operations covering two hundred and forty seconds of time. As switch units A1 through A4 are stepped from (12) to (1), units B1 and B2 are stepped from (10) to (1) and switch unit C1 is again rotated in clockwise direction one step. This positions the entire apparatus for a repetition of the previously described cycle of operations. |

While the circuit constants of the apparatus indicated diagrammatically in Fig. 1 may be widely varied in accordance with environmental conditions and in accordance with good design practice, the values and characteristics of the components may be such as are indicated in the accompanying table:

*Table of component values and characteristics*

| Resistors | Ohms | Resistors | Ohms |
|---|---|---|---|
| R0 | 5 | R1 | 10 |
| R2 | 20 | R3 | 40 |
| R4 | 80 | R5 | 160 |
| R6 | 320 | R7 | 640 |
| R9 | 110 | R10 | 2,805 |
| R11 | 2,805 | R12 | 110 |
| R13 | 1,000 | R14 | 80 |
| R21 | 10 | R22 | 50 |
| R23 | 10,000 | R24 | 10 |
| R25 | 10 | R26 | 10 |
| R27 | 10 | R28 | 50,000 |
| R30 | 10 | R31 | 1,150 |
| R32 | 50,000 | R33 | 100,000 |
| R34 | 200,000 | R35 | 200,000 |
| R36 | 500,000 | R37 | 200,000 |
| R38 | 500,000 | R39 | 500,000 |
| R40 | 500,000 | R41 | 1,000 |
| R42 | 1,500 | R43 | 1,000 |
| R44 | 500,000 | R45 | 500,000 |
| R46 | 1,500 | | |

| Capacitors | Mfds. | Capacitors | Mfds. |
|---|---|---|---|
| Q1 | 0.68 | Q2 | 0.68 |
| Q3 | 1.0 | Q4 | 1.0 |
| Q5 | 1.0 | Q6 | 1.0 |
| Q7 | 1.0 | Q8 | 1.0 |
| Q9 | 0.0047 | Q10 | 120 |
| Q11 | 1.0 | Q12 | 0.1 (each) |
| Q13 | 1.0 | Q14 | 0.1 |

Batteries:
P1—32.5, 65 and 132.6 volts
P2—4.5 volts
P3—13.5 volts

Rectifier X:
International Rect. Corp. No. D2059

Motors:
Mc—"Ledex" BD5ESR35
Cm—"Ledex" BD5ESR25

Relays:
Ry1—Neomatic Relay No. 6931, 500 ohm coil
Ch—Bristol Synchroverter No. 89189, 400 c.p.s.

Transformers:
Tr1—"Triad" HS-11
Tr2—"Triad" HS-60

Inverter:
Iv—Pioneer Instrument Co. No. 12117-6-A, 24 v. D.C., 26 v. A.C. 400 c.p.s.

Valve Coil:
Vc—60 ohms.

The invention herein disclosed and claimed is, in some aspects, an improvement upon the invention disclosed and claimed in the copending application of Robert J. Dwyer, Serial No. 462,917 filed on even date herewith. Further, in some aspects, the invention herein disclosed and claimed is similar to that disclosed and claimed in the copending application of Oddvar M. Johannesen, Serial No. 462,718 filed on even date herewith.

It will be evident to those skilled in the art that considerable modification of details of construction and apparatus according to the invention may readily be made without departing from the spirit of the invention; and accordingly it is not desired to be limited to the specific details of apparatus herein disclosed, but what is claimed is:

1. In a signaling system for simultaneously measuring and encoding information for use in logging-while-drilling operations, the combination comprising: a rotatable camshaft; a plurality of cams fixed to and spaced axially along said camshaft, each of said cams having actuating means formed on the periphery thereof; an electrical network; a plurality of resistances of different predetermined values; a switch associated with each of said cams, with each of said switches positioned for actuation by the actuating means of a different cam in a characteristic angular position with respect to said camshaft to alter the connection of a predetermined one of said resistances with respect to said network; separate mechanical holding means associated with each of said switches and adapted to hold the same in actuated position following actuation thereof as aforesaid; means responsive to a predetermined condition of electrical balance of said network for releasing said holding means to return said switch to its original position to reestablish the original connection of said predetermined resistance with respect to said network; and means for effecting step-wise rotation of said camshaft to actuate each of said switches in succession.

2. In a signaling system for simultaneously measuring and encoding information for use in logging-while-drilling operations, the combination comprising: a rotatable camshaft; a plurality of cams fixed to and spaced axially along said camshaft, each of said cams having a riser formed on the periphery thereof, with each of said risers in a different angular position around said shaft; an electrical network; a plurality of resistances of different predetermined values; a switch associated with each of said cams and adapted to insert a predetermined one of said resistances into said network when in open position; spring-loaded plunger means associated with each of said switches for opening the same and positioned with respect to a cam so that rotation of its riser to a predetermined angular position moves said plunger to a switch-opening position; a latch corresponding to each of said plungers and adapted to hold the same in switch-opening position following movement of said plunger to its switch-opening position; means responsive to the condition of electrical balance of said network as affected by such insertion of resistance thereinto for releasing a latch from its corresponding plunger to open the corresponding switch and remove said predetermined resistance from said network; and means for effecting step-wise rotation of said camshaft to open each of said switches in succession.

3. In a signaling system for simultaneously measuring and encoding information for use in logging-while-drilling operations, the combination comprising: a rotatable camshaft; a plurality of cams fixed to and spaced axially along said shaft, each of said cams having a riser formed on the periphery thereof with each of said risers in a different angular position around said camshaft; an electrical network; a plurality of resistances of different predetermined values; a switch associated with each of said cams and adapted to insert a predetermined one of said resistances into said network when in opened position; spring-loaded plunger means associated with each of said switches for opening the same and positioned with respect to a cam so that rotation of its riser by said shaft to a predetermined angular position moves said plunger to a switch-opening position; a releasable latch positioned adjacent each of said plungers and adapted to engage and hold the same in switch-opening position following movement of said plunger to such position; latch disengaging means for each said latch; means responsive to a predetermined condition of electrical balance of said network as affected by such insertion of resistance thereinto for effecting limited axial translatory displacement of said camshaft for bringing the riser of a cam against the latch disengaging means of the just previously actuated plunger to disengage the same from its corresponding previously actuated plunger; and means for effecting step-wise rotation of said camshaft to move each of said cams sequentially through its plunger-engaging position.

4. In a signaling system for simultaneously measuring and encoding information for use in logging-while-drilling operations, the combination comprising: a rotatable camshaft; a plurality of essentially circular cams fixed to and spaced axially along said camshaft, each of said cams having a radial riser extending from the periphery thereof with said risers in different angular positions around said shaft, an electrical network; a plurality of resistances of different predetermined values; a switch associated with each of said cams and adapted to insert a predetermined one of said resistances into said network when in open position; spring-loaded plunger means reciprocally movable in a direction perpendicular to said camshaft and spaced therealong corresponding to said cams associated with each of said switches for opening the same and each positioned with respect to a cam so that rotation of its riser to a single predetermined angular position moves said plunger to a switch-opening position; a latch positioned adjacent and extending essentially parallel to each of said plungers and adapted to hold the same in switch-opening position; a lobe portion extending from said latch toward said camshaft and terminating short of the radial extent of the main body of each of said cams but within the radial extent of said risers; a solenoid responsive to the condition of electrical balance of said network as affected by the insertion of said resistances thereinto for effecting axial translatory displacement of said camshaft for bringing the riser of a cam in the predetermined angular position against an adjacent lobe portion to disengage the latch from the corresponding plunger and thereby close its corresponding switch to withdraw a corresponding resistance from said network; and means for effecting step-wise rotation of said camshaft to move each of said cams sequentially through its plunger-engaging position.

References Cited in the file of this patent

UNITED STATES PATENTS

| | | |
|---|---|---|
| 1,991,658 | Clark | Feb. 19, 1935 |
| 2,023,221 | Fischer et al. | Dec. 3, 1935 |
| 2,225,668 | Subkow | Dec. 24, 1940 |
| 2,354,887 | Silverman | Aug. 1, 1944 |
| 2,497,961 | Shaw | Feb. 21, 1950 |
| 2,524,031 | Arps | Oct. 3, 1950 |
| 2,547,035 | McWhirter | Apr. 3, 1951 |
| 2,547,875 | Krasnow | Apr. 3, 1951 |
| 2,625,822 | Nichols | Jan. 20, 1953 |

UNITED STATES PATENT OFFICE
CERTIFICATE OF CORRECTION

Patent No. 2,901,685                                                           August 25, 1959

Robert Lee Alder

It is hereby certified that error appears in the printed specification of the above numbered patent requiring correction and that the said Letters Patent should read as corrected below.

Column 11, line 24, for "Fig. 1" read -- Fig. 2 --; column 14, line 23, for "CODING SWITCH" read -- CODING SWITCHES --; column 16, line 27, for "R7...R" read -- R7...R0 --.

Signed and sealed this 1st day of March 1960.

(SEAL)
Attest:

KARL H. AXLINE

Attesting Officer

ROBERT C. WATSON
Commissioner of Patents